Patented Mar. 2, 1943

2,312,734

UNITED STATES PATENT OFFICE 2,312,734

PROCESS AND AGENT FOR BREAKING PETROLEUM EMULSIONS

Richard A. Salathiel, Houston, Tex., assignor to Standard Oil Development Company, a corporation of Delaware No Drawing. Original application October 19, 1938, Serial No. 235,781. Divided and this application December 19, 1939, Serial No. 309,956

14 Claims. (Cl. 252—342)

This invention relates to a process for resolving water-in-oil emulsions and particularly to a new composition for the resolution of such emulsions.

This application is a division of co-pending application Serial Number 235,781, filed October 19, 1938.

Petroleum emulsions of the water-in-oil type comprise fine droplets of naturally occurring waters or brines, dispersed in a more or less permanent state throughout the oil which constitutes the continuous phase of the emulsion. They are obtained from producing wells and from the bottom of oil storage tanks, and are commonly referred to as "cut oil," "roily oil," "emulsified oil," and "bottom settlings."

The object of the present invention is to provide a novel and inexpensive process for separating emulsions of the character referred to into their component parts of oil and water or brine.

Briefly described, the present process consists in subjecting a petroleum emulsion of the water-in-oil type to the action of a treating agent or demulsifying agent of the kind hereinafter described, thereby causing the emulsion to break down and separate into its component parts of oil and water or brine, when the emulsion is permitted to remain in a quiescent state after treatment, or is subjected to other equivalent separatory procedures.

The treating agents used in this process consist of derivatives of organic, preferably aliphatic, unsaturated carbonyl compounds obtained by the consideration therewith of resin acids or resin acid bodies.

As used herein the term resin acid is used to designate abietic acid and pimaric, copaivic, palabietic, and other acids derived from the oleo-resinous exudates from various species of Coniferae which are either identical or isomeric with abietic acid or are changed to abietic acid or an isomer of abietic acid by heating. The term resin acid body is used to designate these acids or simple functional derivatives of these acids, such as salts, anhydrides and esters. Similarly, the term abietic acid body embraces salts, esters, and the anhydride of abietic acid.

Typical of the unsaturated organic carbonyl which may be employed are polycarboxylic unsaturated open chain acids, such as maleic acid and fumaric acid, their anhydrides and the corresponding aldehydes and ketones, benzoquinone and the like.

Resin acid bodies, for example, abietic acid and its esters, have the property of condensing through their unsaturated linkages with polycarboxylic unsaturated open chain acids and derivatives thereof in which the unsaturated groupings are preserved. Most commonly this reaction is carried out with maleic acid or maleic anhydride, or the corresponding fumaric compound. For the sake of simplicity, maleic anhydride and esters of maleic acid will be hereinafter referred to for illustrative purposes, but it is to be understood that in such references the whole group to which these substances belong is contemplated.

There are two steps in the preparation of these treating agents. The first is condensation by the well known Diels-Alder diene reaction of a mol of the resin acid body with a mol of maleic anhydride to form a polybasic acid body. This condensation is usually carried out by heating the reactants. Reaction usually begins at about 100° C. but for a practical rate of reaction a temperature of the order of 200° to 250° C. should be employed. The upper limit on the condensation temperature is that temperature at which the reactants decompose, and other detrimental reactions take place.

The second step is the reaction of this polybasic acid body to form suitable derivatives. The polybasic acid body may be combined with water soluble bases, such as NaOH, NH4OH, trimethanol amine, etc., to form salts which have effective demulsifying powers for some emulsions. The polybasic acid body may be esterified with monohydric alcohols and with ether-alcohols to yield materials that economically demulsify some emulsions. The term ether-alcohol is used herein to designate an organic compound characterized by the presence of both alcoholic hydroxyl and etheric oxygen (—O—), groups. Among suitable alcohols for the purpose may be mentioned mono-methyl, mono-ethyl, mono-propyl, mono-butyl, mono-amyl, etc., ethers of ethylene glycol, diethylene glycol, triethylene glycol, tetraethylene glycol, etc., propylene glycol, butylene glycol and other glycols; di-methyl, di-ethyl, di-propyl, di-butyl, etc., ethers of glycerol, and other tri-hydric alcohols; mono-alkyl ethers of tri-methylene glycol, tetra-methylene glycol, penta-methylene glycol, and the like. Also the polybasic acid bodies may be condensed with polyhydric alcohols to yield materials having excellent demulsifying powers. Typical of the polyhydric alcohols which may be employed are ethylene glycol, diethylene glycol, triethylene glycol, tetraethylene glycol, propylene glycol, butylene glycol, trimethylene glycol, tetramethylene glycol, pentamethylene glycol, glycerol, α,β,γ,-butanetriol, α,β,γ pentanetriol, α,α,γ,γ tetramethyl glycerol, pentaglycerol, erythritol, pentaglycerol, pentaerythritol, ortho, meta, and para phthalyl alcohols, mesicerin, etc.

Also suitable derivatives are formed by combining the reactions described above. Thus, mixed monohydric and polyhydric alcohol ester derivatives of the condensed polybasic acid body may be produced. Likewise, partially saponified complex ester derivatives of the resin acid body-maleic anhydride condensation product may be highly efficient demulsifying chemicals.

The order in which the reactions in the preparation of these derivatives are carried out is in most cases immaterial. A derivative of the condensed acid body may be prepared before or after condensation. For example, it is immaterial whether the mono-butyl ether of diethylene glycol is esterified with maleic acid and the resulting ester condensed with methyl abietate or the methyl abietate is first condensed with maleic anhydride and the resulting condensation product esterified with the mono-butyl ether of diethylene glycol. It is the final product that it is desired to describe by the reactions set down. Reactions caried out in any other order to obtain these products must be regarded as equivalent.

The reagents preferred for use in practicing the process of the present invention are either the monohydric or the polyhydric alcohol ester derivatives of the acid resin obtained by condensing an abietic acid body with maleic anhydride.

Specific illustrations of the products of the type hereinbefore generally described which are suitable for use in accordance with the present invention are set forth below. It is to be understood that the present invention is not in any way restricted to the specific chemicals described in these examples or the proportions in which they are employed, as it will be readily apparent that equivalents of these specific chemicals and other proportions, as well as variations of the order and mode of combination may be employed without departing from the spirit of the present invention or the scope of the appended claims. In these examples proportions are given as parts by weight.

Example I

Methyl abietate, 316 parts, and maleic anhydride, 98 parts, are condensed together by heating at 230° C. for an hour. A small excess, say 290 parts, of diethylene glycol mono-butyl ether is added and the mixture refluxed in an apparatus fitted with a fractionating reflux column, devised to remove the waters rapidly as possible as it is formed, by heating to about 220° to 250° C. until the reaction is complete, or for about four hours. The product is a highly viscous liquid readily soluble in most organic solvents.

Example II

Rosin, 2000 parts (combining weight as acid, 340), and maleic anhydride, 575 parts, are heated together at 170° C. for two and a half hours to effect complete condensation. Then 895 parts of glycerol are added and heated at 195–200° C. with efficient agitation for thirty minutes to yield a very hard brittle resin, solutions of which, in inert solvents, have excellent demulsifying properties. It dissolves suitable in aromatic solvent-isopropyl alcohol blends.

Example III

Methyl abietate, 680 parts, and maleic anhydride, 214 parts, are condensed together by heating at 230° C. for an hour. Glycerol, 134 parts, is added and the mixture heated, under thorough stirring, at 195° C. for an hour and then at 230° C. for an hour. This yields a fairly hard resinous material which dissolves suitable in aromatic solvent-isopropyl alcohol blends.

Example IV

Butyl carbitol abietate (diethylene glycol mono-butyl ether abietiate) 446 parts, and maleic anhydride, 98 parts, are heated together at 205° C. for two hours to effect condensation. This product is reacted with glycerol, 62 parts, by agitating thoroughly and heating at 190° C. for thirty minutes and then at 220° C. for forty minutes to yield a soft, semi-solid resin.

Example V

Amyl abietate, 372 parts, and maleic anhydride, 98 parts, are heated together for two hours at 215° C. to effect condensation. Glycerol, 91 parts, is added and the mixture heated at 225° C. for two hours to yield a hard resinous body which dissolves suitable in isopropyl alcohol-aromatic solvent blends.

Example VI

Methyl abietate, 316 parts, and maleic anhydride, 98 parts, are condensed together by heating at 230° C. for an hour. Ethylene glycol, 62 parts, is added and the mixture heated with efficient stirring at 230° C. for two hours to yield a hard resin, solutions of which in inert solvents have excellent demulsifying properties. It dissolves suitable in aromatic solvent-isopropyl alcohol blends.

In practicing the process of the present invention the materials previously described need not be employed alone but may be employed in conjunction with other suitable demulsifiers such as water softeners, modified fatty acids, oil soluble or water soluble petroleum sulfonic acids and various other well known demulsifiers for water-in-oil emulsions. The mixtures and proportions of the chemicals which yield the most economical treatment will vary with the various emulsions to be treated. One may add any suitable inert solvent or solvents which would lower the viscosity of the product and so make it more adaptable for use.

In practicing the present invention, a treating agent or demulsifying agent of the kind above described may be brought into contact with the emulsion to be treated in any of the numerous ways now employed in the treatment of petroleum emulsions of the water-in-oil type with chemical demulsifying agents, such as, for example, by introducing the treating agent into the well in which the emulsion is produced, introducing the treating agent into a tank in which the emulsion is stored, or introducing the treating agent into a container that holds a sludge obtained from the bottom of an oil storage tank. In some instances, it may be advisable to introduce the treating agent into a producing well in such a way that it will become mixed with water and oil that are emerging from the surrounding strata, before said water and oil enter the barrel of the well pump or the tubing up through which said water and oil flow to the surface of the ground. After treatment the emulsion is allowed to stand in a quiescent state, usually in a settling tank, at a temperature varying from atmospheric temperature to about 200° F., so as to permit the water or brine to separate from the oil, it being preferable to keep the temperature low enough so as to prevent the valuable constituents of the oil from volatilizing. If desired, the treated emulsion may be acted upon by one or the other of various kinds of apparatus now used in the operation of breaking petroleum emulsions, such as homogenizers, hay tanks, gun barrels, filters, centrifuges, or electrical dehydrators.

The amount of treating agent on the anhydrous basis that is required to break the emulsion may vary from approximately 1 part of the treating agent to 500 parts of emulsion up to 1 part of treating agent to 30,000 parts of emulsion depending upon the type or kind of emulsion being treated. In treating exceptionally refractory emulsions of the kind commonly referred to as "tank bottoms" or "residual pit oils," the maximum ratio above referred to may be required, but in treating fresh emulsions, i. e., emulsions that will yield readily to the action of chemical demulsifying agents, the minimum ratio mentioned may frequently be satisfactory. For the average petroleum emulsion of the water-in-oil type a ratio of 1 part of treating agent to 10,000 parts of emulsion will usually be found to produce commercially satisfactory results.

It is, of course, understood that some experiment will be required in order to select the precise agent of the aforedescribed group which should be employed for any given emulsion and the quantity in which it is to be employed. As is well known, emulsions vary from well to well and from time to time in any given well, so that it is quite impossible to lay down any general rule which will be applicable to all emulsions which may be encountered. In order to give some indication, however, of the utility of the agents produced according to the present invention, in the treatment of emulsions, the following specific cases are given. The tests hereinafter described were carried out in laboratory glassware under conditions similar to those which generally exist in the field in treating petroleum emulsions:

A crude petroleum emulsion (from the Humble Gail #53 well on the John Gaillard lease in the Goose Creek, Texas, field) which contained 68% of salt water, was caused to separate into three layers in a few minutes at 125° F. by the addition of a small amount of solution containing four hundredths of one percent (based on the amount of emulsion treated) of material prepared as described in Example II, mixing well and allowing to stand. The top layer contained practically all of the oil almost entirely free from water. The middle layer which was quite thin compared to the other two layers contained mineral oil, water, and the added substance. The bottom layer contained practically all of the salt water free from oil.

Under the same conditions this emulsion remained practically unchanged for many hours if no chemical was added.

The same emulsion was caused to separate in a few minutes at 125° F. into two layers by the addition of a small amount of solution containing two hundredths of one percent of material prepared as described in Example II and two hundredths of one percent of oil soluble salts of petroleum sulfonic acids, (based on the amount of emulsion taken) mixing well and allowing to stand. The upper layer was composed of clear oil practically free of salt water and the lower layer was composed of salt water practically free of oil.

Even several times the amount of the oil soluble sodium salts of petroleum sulfonic acids which in the above case was added, if applied alone under the same conditions, has no appreciable effect in breaking this emulsion.

The same emulsion was caused to separate almost completely within 30 minutes at 125° F. into two layers, the upper layer being oil, nearly free of salt water, and the lower layer being salt water, nearly free of oil, by adding a small amount of solution containing 1 part of material prepared as described in Example III to 5,000 parts of emulsion, mixing well, and allowing to stand.

This same emulsion was broken and caused to separate into layers of oil, practically free of salt water, and of salt water, practically free of oil, within 30 minutes at 125° F. by adding a small amount of solution containing 1 part of material prepared as described in Example III and 1 part of oil soluble salts of petroleum sulfonic acids to 10,000 parts of emulsion, mixing well and allowing to stand.

The present invention having been thus described, what is claimed as new and useful and is desired to be secured by Letters Patent is:

1. A process for breaking petroleum emulsions of the water-in-oil type which comprises subjecting the emulsion to the action of a monohydric alcohol ester derivative of a product obtained by condensing according to the Diels-Alder reaction an aliphatic ether-alcohol ester of a resin acid body with an organic unsaturated carbonyl compound operative in a Diels-Alder synthesis.

2. A process for breaking petroleum emulsions of the water-in-oil type which comprises subjecting the emulsion to the action of a monohydric alcohol ester derivative of a product obtained by condensing according to the Diels-Alder reaction an aliphatic ether-alcohol ester of a resin acid body with a polycarboxylic unsaturated open chain acid body operative in a Diels-Alder synthesis.

3. A process for breaking petroleum emulsions of the water-in-oil type which comprises subjecting the emulsion to the action of a monohydric alcohol ester derivative of a product obtained by condensing according to the Diels-Alder reaction an aliphatic ether-alcohol ester of an abietic acid with a polycarboxylic unsaturated open chain acid body operative in a Diels-Alder synthesis.

4. A process for breaking petroleum emulsions of the water-in-oil type which comprises subjecting the emulsion to the action of a demulsifying agent comprising a monohydric aliphatic alcohol ester derivative of an acidic resin, the monohydric alcohol residue or residues each being characterized by having fewer than six carbon atoms, the acidic resin being derived by a Diels-Alder condensation of an aliphatic ether-alcohol ester of abietic acid with maleic anhydride, the aliphatic ether-alcohol residue so combined being characterized by having at least one etheric oxygen atom for each six carbon atoms.

5. A process for breaking petroleum emulsions of the water-in-oil type which comprises subjecting the emulsion to the action of a polyhydric alcohol ester of a product obtained by condensing according to the Diels-Alder reaction a monohydric ether-alcohol ester of a resin acid with a polycarboxylic unsaturated open chain acid body operative in a Diels-Alder synthesis.

6. A process for breaking petroleum emulsions of the water-in-oil type which comprises subjecting the emulsion to the action of a polyhydric alcohol ester of a product obtained by condensing according to the Diels-Alder reaction a monohydric ether-alcohol ester of a resin acid with a maleic acid body.

7. A process for breaking petroleum emulsions of the water-in-oil type which comprises subjecting the emulsion to the action of a polyhydric alcohol ester of a product obtained by condensing according to the Diels-Alder reaction a monohydric ether-alcohol ester of abietic acid with a polycarboxylic unsaturated open chain acid body operative in a Diels-Alder synthesis.

8. A process for breaking petroleum emulsions of the water-in-oil type which comprises subjecting the emulsion to the action of a demulsifying agent comprising the reaction product of a polyhydric alcohol and the polybasic acid body formed by a Diels-Alder condensation of a monohydric aliphatic ether-alcohol ester of abietic acid with maleic anhydride, the monohydric aliphatic ether-alcohol residue so combined being characterized by having at least one etheric oxygen atom for each six carbon atoms in the monohydric ether-alcohol residue.

9. A process for breaking petroleum emulsions of the water-in-oil type which comprises subjecting the emulsion to the action of a demulsifying agent comprising a polyhydric alcohol derivative of the polybasic acid body formed by a Diels-Alder condensation of butyl carbitol abietate with maleic anhydride.

10. A demulsifying agent for petroleum emulsions of the water-in-oil type comprising an ester of a product obtained by condensing according to the Diels-Alder reaction, an aliphatic ether-alcohol ester of a resin acid body with a carboxylic unsaturated open-chain acid body operative in a Diels-Alder synthesis.

11. A demulsifying agent according to claim 10 in which the ester is a monohydric alcohol ester.

12. A demulsifying agent according to claim 10 in which the ester is a polyhydric alcohol ester.

13. A demulsifying agent according to claim 10 in which the ether-alcohol is butyl carbitol.

14. A demulsifying agent for petroleum emulsions of the water-in-oil type comprising a polyhydric alcohol derivative of a polybasic acid body formed by a Diels-Alder condensation of butyl carbitol abietate with maleic anhydride.

RICHARD A. SALATHIEL.